US008797774B2

(12) United States Patent
Kaneko

(10) Patent No.: US 8,797,774 B2
(45) Date of Patent: Aug. 5, 2014

(54) MANUFACTURING METHOD FOR CHOPPER CIRCUIT, CHOPPER CIRCUIT, DC/DC CONVERTER, FUEL CELL SYSTEM, AND CONTROL METHOD

(75) Inventor: Tomohiko Kaneko, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 29 days.

(21) Appl. No.: 13/695,534

(22) PCT Filed: Apr. 8, 2011

(86) PCT No.: PCT/IB2011/000763
§ 371 (c)(1),
(2), (4) Date: Oct. 31, 2012

(87) PCT Pub. No.: WO2011/158073
PCT Pub. Date: Dec. 22, 2011

(65) Prior Publication Data
US 2013/0049726 A1 Feb. 28, 2013

(30) Foreign Application Priority Data
Apr. 30, 2010 (JP) ................................. 2010-104789

(51) Int. Cl.
*H02M 3/155* (2006.01)
(52) U.S. Cl.
USPC ........................................................ 363/124
(58) Field of Classification Search
USPC ........... 363/124; 323/222, 906; 703/2, 18, 19; 716/100, 132, 133
See application file for complete search history.

(56) References Cited

U.S. PATENT DOCUMENTS

| 5,414,613 A * | 5/1995 | Chen ............................... 363/52 |
| 7,667,986 B2 * | 2/2010 | Artusi et al. .................... 363/16 |
| 2006/0075365 A1 * | 4/2006 | Hershenson et al. ............. 716/2 |
| 2008/0037304 A1 * | 2/2008 | Suzuki et al. ................. 363/131 |

FOREIGN PATENT DOCUMENTS

| EP | 1 990 901 A2 | 11/2008 |
| JP | 2007-274778 A | 10/2007 |
| JP | 2008-283815 A | 11/2008 |
| JP | 2009-165245 A | 7/2009 |
| WO | 2006098376 A1 | 9/2006 |

OTHER PUBLICATIONS

International Search Report of PCT/IB2011/000763 mailed Dec. 2, 2011.

* cited by examiner

*Primary Examiner* — Gary L Laxton
(74) *Attorney, Agent, or Firm* — Kenyon & Kenyon LLP

(57) ABSTRACT

A manufacturing method for a chopper circuit that uses soft switching operation includes: identifying devices that constitute the chopper circuit and that are relevant to determining time at which a voltage applied to a main switching element during operation of the chopper circuit takes a minimum value; calculating a design representative value of an observed device that is at least one of the identified devices in such a manner that a plurality of the observed devices are prepared and then variations from a rated value in electrical characteristic of each observed device are subjected to statistical processing; and setting the representative value, instead of the rated value of the electrical characteristic of the observed device, in a switching control unit that controls the timings of switching of the main switching element and an auxiliary switching element on the basis of the electrical characteristics of the identified devices.

11 Claims, 12 Drawing Sheets

SOFT SWITCHING PROCESS

F I G . 13
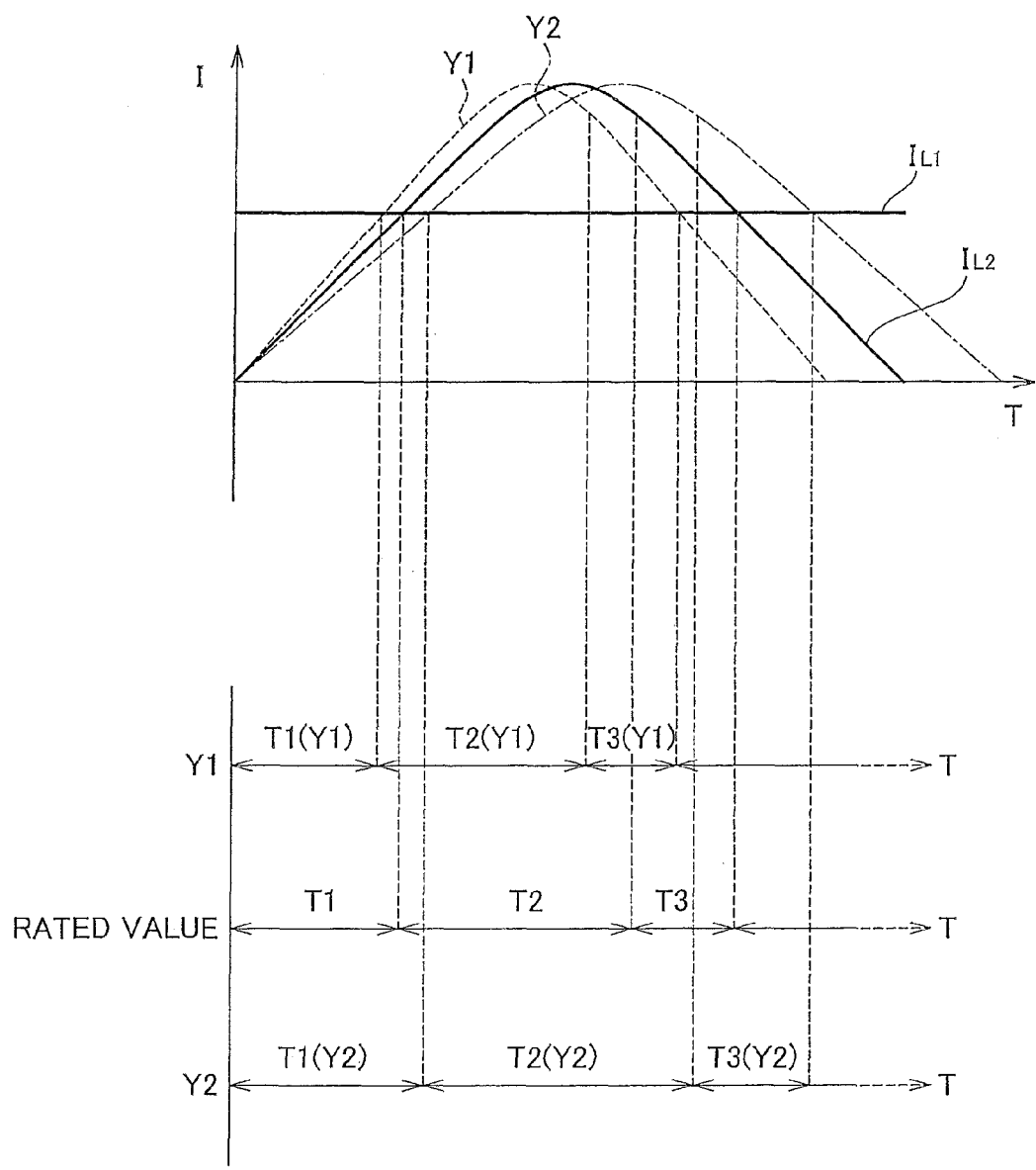

MANUFACTURING METHOD FOR CHOPPER CIRCUIT, CHOPPER CIRCUIT, DC/DC CONVERTER, FUEL CELL SYSTEM, AND CONTROL METHOD

This is a 371 national phase application of PCT/IB2011/000763 filed 8 Apr. 2011, claiming priority to Japanese Patent Application No. 2010-104789 filed 30 Apr. 2010, the contents of which are incorporated herein by reference.

BACKGROUND OF THE INVENTION

1. Field of the Invention

The invention relates to a technique for controlling a chopper circuit that uses soft switching operation.

2. Description of the Related Art

In the field using a semiconductor power converter, a soft switching chopper circuit is used in order to reduce a power loss. The chopper circuit includes a main circuit and an auxiliary circuit. The main circuit has a main reactor and a•main switching element. The auxiliary circuit has an auxiliary reactor, an auxiliary switching element and an auxiliary capacitor. In soft switching operation in which the auxiliary switching element is turned on and then the main switching element is turned on, there is known a technique described in Japanese Patent Application Publication No. 2008-283815 (JP-A-2008-283815) as a technique for controlling the timing of switching of the main switching element and the timing of switching of the auxiliary switching element.

In the above technique, when the electrical characteristic of a device that constitutes the chopper circuit (for example, the inductance of the auxiliary reactor, the capacitance of the capacitor, or the like) varies and differs from a rated value, switching of the main switching element may be performed in a state where the voltage between both ends of the main switching element is relatively high, so it has been pointed out that a large power loss occurs because of the switching.

SUMMARY OF INVENTION

The invention provides a technique for suppressing a power loss during switching due to variations from a rated value in electrical characteristic of a device that constitutes a chopper circuit.

An aspect of the invention provides a manufacturing method for a chopper circuit that uses soft switching operation in which the timing of switching of an auxiliary switching element is controlled to thereby control a voltage applied to a main switching element at the time of switching of the main switching element. The manufacturing method includes: identifying devices that constitute the chopper circuit and that are relevant to determining time at which the voltage applied to the main switching element during operation of the chopper circuit takes a minimum value; calculating a design representative value of an observed device that, is at least one of the identified devices in such a manner that a plurality of the observed devices are prepared and then variations from a rated value in electrical characteristic of each observed device are subjected to statistical processing; and setting the representative value, instead of the rated value of the electrical characteristic of the observed device, in a switching control unit of the chopper circuit, which controls the timing of switching of the main switching element and the timing of switching of the auxiliary switching element on the basis of the electrical characteristics of the identified devices.

In the chopper circuit, the rated values of the identified devices relevant to determining the time at which the voltage applied to the main switching element takes a minimum value may be different from the actual electrical characteristics of the identified devices. In this case, if the rated values are used to determine the time at which the voltage applied to the main switching element takes a minimum value, the electrical characteristics of the devices that are actually used in the chopper circuit differ from the rated values, so the determined time may be significantly different from time at which the voltage applied to the main switching element of the actual chopper circuit takes a minimum value, and a power loss occurs at the time of switching.

On the other hand, with the above manufacturing method, a design representative value is calculated in such a manner that variations from the rated value in electrical characteristic of each observed device are subjected to statistical processing, and then the calculated representative value is used to determine time at which the voltage applied to the main switching element takes a minimum value. Therefore, in comparison with the case where the rated value is used to determine time at which the voltage applied to the main switching element takes a minimum value, the probability that the determined time significantly differs from the time at which the voltage applied to the main switching element of the actual chopper circuit takes a minimum value reduces, so it is possible to suppress a power loss at the time of switching.

Here, a normal distribution may be used as the statistical processing for calculating the representative value, and an electrical characteristic corresponding to a maximum value of the normal distribution may be used as the representative value. In addition, a deviation of the electrical characteristic of the observed device from the rated value may be measured, a standard deviation based on the measured deviation may be measured, and then the representative value may be calculated on the basis of the rated value and the standard deviation.

In addition, in the manufacturing method, the electrical characteristics of the identified devices may include an inductance of an auxiliary reactor that controls the voltage applied to the main switching element at the time of switching of the main switching element. With the above manufacturing method, it is possible to at least identify the auxiliary reactor as the device relevant to determining the time at which the voltage applied to the main switching element takes a minimum value.

In addition, in the manufacturing method, the electrical characteristics of the identified devices may include a capacitance of an auxiliary capacitor that controls the voltage applied to the main switching element at the time of switching of the main switching element. With the above manufacturing method, it is possible to at least identify the auxiliary capacitor as the device relevant to determining the time at which the voltage applied to the main switching element takes a minimum value.

In addition, the manufacturing method, optimization through the statistical processing may be a process in which electrical characteristics of a predetermined number of the plurality of observed devices are measured and then the representative value is calculated on the basis of a distribution of the measured electrical characteristics. With the above manufacturing method, it is possible to calculate a representative value on the basis of a distribution of the measured electrical characteristics of the plurality of observed devices as the statistical processing.

Another aspect of the invention provides a chopper circuit that uses soft switching operation in which the timing of switching of an auxiliary switching element is controlled to thereby control a voltage applied to a main switching element at the time of switching of the main switching element. The chopper circuit includes: a switching control unit that controls the timing of switching of the main switching element and the timing of switching of the auxiliary switching element using a design representative value of an observed device that is at least one of specific devices that constitute the chopper circuit and that are relevant to determining time at which the voltage applied to the main switching element takes a minimum value, wherein the representative value is calculated in such a manner that a plurality of the observed devices are prepared and then variations from a rated value in electrical characteristic of each observed device are subjected to statistical processing.

With the above chopper circuit, a design representative value is calculated in such a manner that variations from the rated value in electrical characteristic of each observed device are subjected to statistical processing, and then the calculated representative value is used to control the timing of switching of the main switching element and the timing of switching of the auxiliary switching element. Therefore, in comparison with the timing at which the voltage applied to the main switching element takes a minimum value and that is calculated using the rated value of the observed device, the timing at which the voltage applied to the main switching element takes a minimum value and that is calculated using the representative value reduces the probability that the determined timing significantly differs from the timing at which the voltage applied to the main switching element of the actual chopper circuit takes a minimum value, and it is possible to suppress a power loss at the time of switching.

In addition, in the chopper circuit, when a period of time up to when the voltage applied to the main switching element becomes a minimum value is Ta and a period of time during which the voltage is maintained at the minimum value is Tb, the switching control unit may control the switching at a timing that is later than Ta determined by a combination of the specific devices that take a maximum voltage at Ta and that is earlier than Ta+½Tb determined by a combination of the specific devices that take a minimum voltage at Ta+½Tb. With the chopper circuit, switching of the main switching may be reliably performed at the time at which the voltage applied to the main switching element takes a minimum value.

Further another aspect of the invention provides a DC/DC converter. The DC/DC converter includes: a DC input unit that is connected to a direct-current power supply; a chopper circuit that converts a voltage of a direct-current power input from the DC input unit, that includes a main switching element and an auxiliary switching element, and that uses soft switching operation in which the timing of switching of the auxiliary switching element is controlled to thereby control a voltage applied to the main switching element at the time of switching of the main switching element; a DC output unit that outputs the direct-current voltage of which a voltage is converted by the chopper circuit; and a switching control unit that controls the timing of switching of the main switching element and the timing of switching of the auxiliary switching element using a design representative value of an observed device that is at least one of specific devices that constitute the chopper circuit and that are relevant to determining time at which the voltage applied to the main switching element takes a minimum value, wherein the representative value is calculated in such a manner that a plurality of the observed devices are prepared and then variations from a rated value in electrical characteristic of each observed device are subjected to statistical processing.

With the above DC/DC converter, the chopper circuit calculates a design representative value in such a manner that variations from the rated value in electrical characteristic of each observed device are subjected to statistical processing, and then uses the calculated representative value to control the timing of switching of the main switching element and the timing of switching of the auxiliary switching element. Therefore, in comparison with the timing at which the voltage applied to the main switching element takes a minimum value and that is calculated using the rated value of the observed device, the timing at which the voltage applied to the main switching element takes a minimum value and that is calculated using the representative value reduces the probability that the determined timing significantly differs from the timing at which the voltage applied to the main switching element of the actual chopper circuit takes a minimum value, and it is possible to suppress a power loss at the time of switching.

Yet another aspect of the invention provides a fuel cell system. The fuel cell system includes: a fuel cell that supplies electric power to a load; a DC/DC converter that uses a chopper circuit having a main switching element and an auxiliary switching element to control a voltage of the electric power, wherein the chopper circuit uses soft switching operation in which the timing of switching of the auxiliary switching element is controlled to thereby control a voltage applied to the main switching element at the time of switching of the main switching element; and a switching control unit that controls the timing of switching of the main switching element and the timing of switching of the auxiliary switching element using a design representative value of an observed device that is at least one of specific devices that constitute the chopper circuit and that are relevant to determining time at which the voltage applied to the main switching element takes a minimum value, wherein the representative value is calculated in such a manner that a plurality of the observed devices are prepared and then variations from a rated value in electrical characteristic of each observed device are subjected to statistical processing.

With the above fuel cell system, the chopper circuit calculates a design representative value in such a manner that variations from the rated value in electrical characteristic of each observed device are subjected to statistical processing, and then uses the calculated representative value to control the timing of switching of the main switching element and the timing of switching of the auxiliary switching element. Therefore, in comparison with the timing at which the voltage applied to the main switching element takes a minimum value and that is calculated using the rated value of the observed device, the timing at which the voltage applied to the main switching element takes a minimum value and that is calculated using the representative value reduces the probability that the determined timing significantly differs from the timing at which the voltage applied to the main switching element of the actual chopper circuit takes a minimum value, and it is possible to suppress a power loss at the time of switching.

Yet further another aspect of the invention provides a control method for controlling the timing of switching of a main switching element and the timing of switching of an auxiliary switching element, wherein the main switching element and the auxiliary switching element are included in a chopper circuit that uses soft switching operation in which the timing of switching of the auxiliary switching element is controlled to thereby control a voltage applied to the main switching element at the time of switching of the main switching element. The control method includes: calculating a design representative value of an observed device, which is at least one of specific devices that constitute the chopper circuit and that are relevant to determining time at which the voltage applied to the main switching element takes a minimum value, in such a manner that a plurality of the observed devices are prepared and then variations from a rated value in electrical characteristic of each observed device are subjected to statistical processing; and controlling the timing of switching of the main switching element and the timing of switching of the auxiliary switching element using the representative value.

With the above control method, in comparison with the case where the timing of switching is controlled on the basis of the rated value of the observed device, it is possible to suppress a power loss due to switching.

Note that the aspects of the invention may be implemented in various forms. For example, the aspects of the invention may be implemented in a form, such as a soft switching control method, a soft switching control device, an electric power conversion system, an integrated circuit and computer program for implementing the functions of the method or device and a recording medium that records the computer program therein.

BRIEF DESCRIPTION OF DRAWINGS

The features, advantages, and technical and industrial significance of this invention will be described below with reference to the accompanying drawings, in which like numerals denote like elements, and wherein:

FIG. 13 is a graph for illustrating influence of variations in electrical characteristic of a device on the time periods T1 to T3 according to the embodiment;

DETAILED DESCRIPTION OF EMBODIMENTS

Hereinafter, an embodiment of the invention will be described. First, the configuration of a fuel cell system according to the embodiment will be described.

Figure 1:
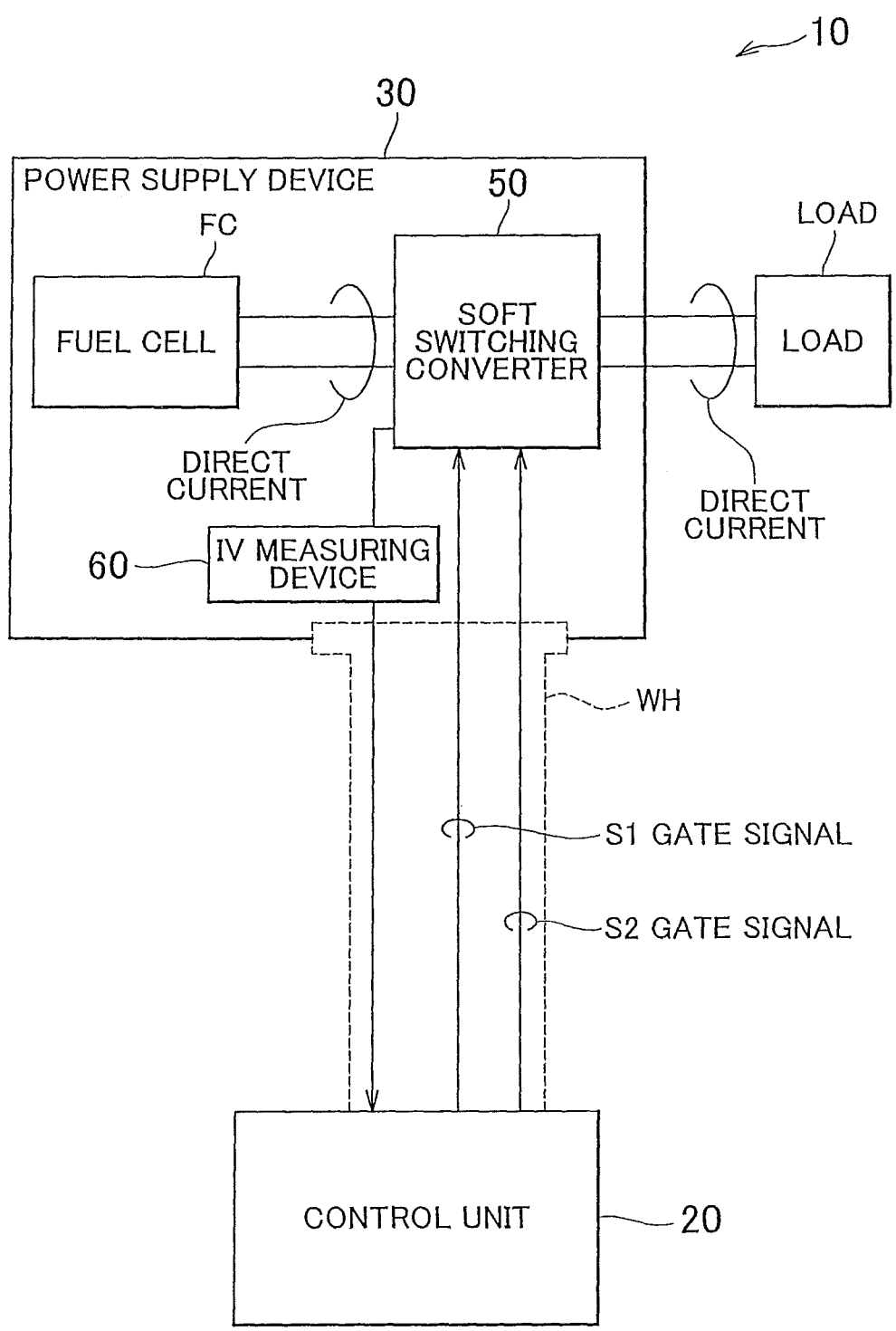
FIG. 1 is a view that illustrates the configuration of a fuel cell system 10 equipped for a vehicle according to an embodiment of the invention.

FIG. 1 is a view that illustrates the configuration of a fuel cell system 10 equipped for a vehicle according to the embodiment. A fuel cell hybrid vehicle (FCHV) is assumed as an example of the vehicle in the present embodiment; however, the present embodiment may also be applied to an electric vehicle or a hybrid vehicle.

The fuel cell system 10 includes a control unit 20, a power supply device 30 and a load LOAD. The power supply device 30 supplies direct-current power to the load. LOAD. The load LOAD is primarily a vehicle driving motor, and also includes peripheral devices (illumination lamp, audio, or the like) as other loads. These loads, for example, include a load that operates on direct current or a load that operates on alternating current via an inverter. The power supply device 30 is connected to the control unit 20 by a wire harness WH. For example, while the vehicle is running, the control unit 20 computes a power required by the vehicle driving motor on the basis of driver's accelerator operation, and then controls an electric power output from the power supply device 30 to the load LOAD in response to the computed result. The power supply device 30 includes a fuel cell FC, a soft switching converter 50 and a current and voltage measuring device 60 (hereinafter, also referred to as IV measuring device 60).

The fuel cell FC employs a power generation mode that produces electric power from supplied fuel gas (for example, hydrogen gas) and oxidation gas. The fuel cell FC has a stack structure in which a plurality of single cells each having a membrane electrode assembly (MEA), and the like, are stacked in series with one another. Not only a polymer electrolyte fuel cell but also various types of fuel cells, such as a phosphoric acid fuel cell and a molten carbonate fuel cell, may be used as the fuel cell FC.

The soft switching converter 50 is a DC/DC converter (step-up converter) that steps up the voltage of direct-current power supplied from the fuel cell FC. The soft switching converter 50 includes a switching element S1 and a switching element S2, which will be described later. The soft switching converter 50 is formed of a chopper circuit that controls electric power supplied to the load LOAD by means of switching operation of the switching elements S1 and S2. The IV measuring device 60 constantly measures a predetermined current value and a predetermined voltage value of the soft switching converter 50, and transmits those values to the control unit 20 in real time.

The control unit 20 is configured as a microcomputer that includes a CPU, a RAM and a ROM inside. The control unit 20 outputs the gate signals toward the soft switching converter 50 in accordance with the above described processing based on the acceleration, or the like. The gate signals respectively control the timings of switching of the switching elements S1 and S2 of the soft switching converter 50. Specifically, the control unit 20 outputs the S1 gate signal and the S2 gate signal toward the soft switching converter 50 via the wire harness WH. The S1 gate signal is used to control the timing of switching of the switching element S1. The S2 gate signal is used to control the timing of switching of the switching element S2. That is, the control unit 20 outputs the S1 gate signal and the S2 gate signal to the soft switching converter 50 to thereby control electric power supplied from the power supply device 30 to the load LOAD.

Figure 2:
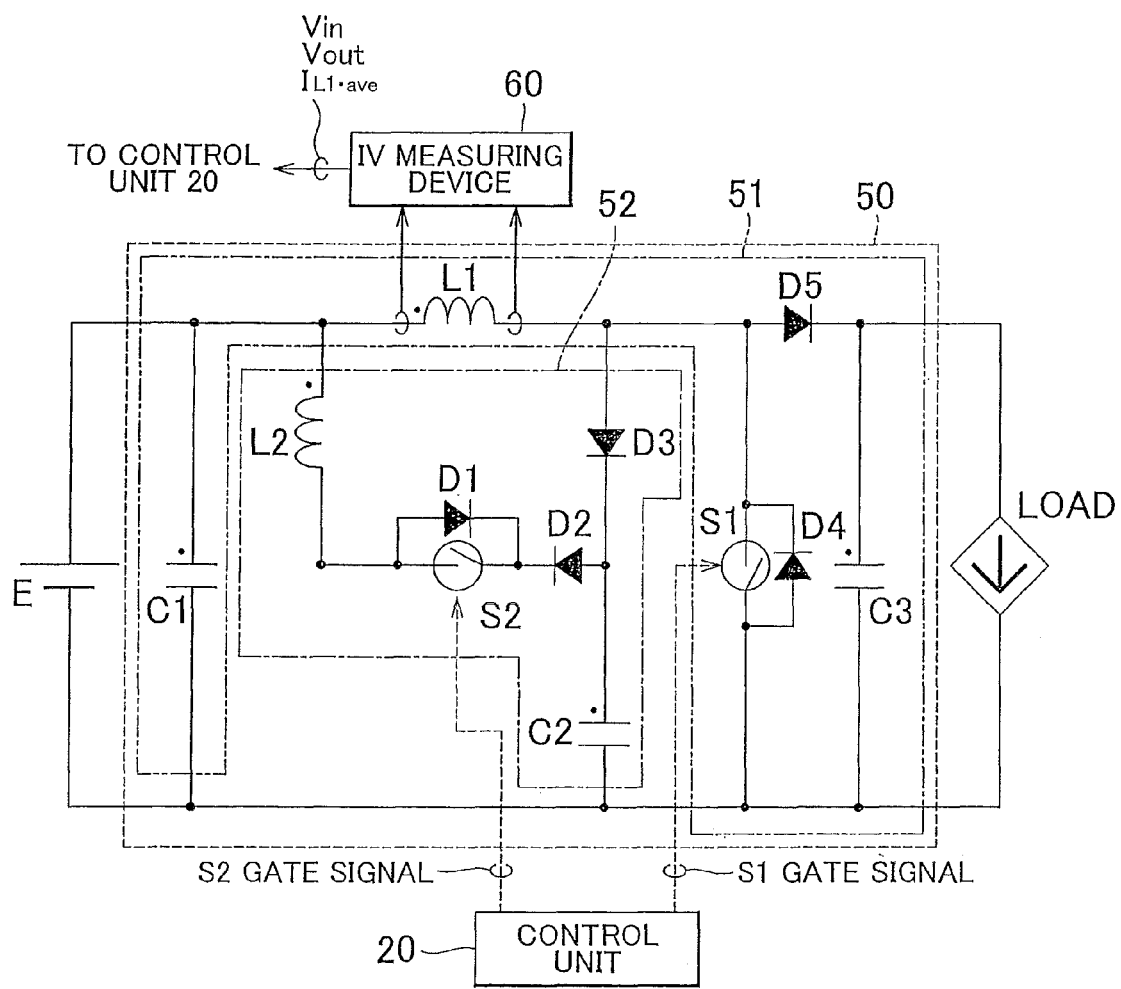
FIG. 2 is a view that illustrates the circuit configuration of a soft switching converter 50 according to the embodiment.

Next, the configuration and operation of the soft switching converter 50 will be described. FIG. 2 is a view that illustrates the circuit configuration of the soft switching converter 50. The soft switching converter is a converter that uses soft switching operation in which the timing of switching operation of an auxiliary switching element (switching element S2 in the present embodiment) that constitutes the circuit is controlled to reduce the voltage applied between both ends of a main switching element (switching element S1 in the present embodiment) when switching of the main switching element is performed to thereby reduce a power loss due to switching of the switching element S1. Incidentally, the detailed operation principle of the soft switching converter is described in Japanese Patent Application Publication No. 2009-165245 (JP-A-2009-165245).

The soft switching converter 50 is formed of a chopper circuit that includes a main circuit 51 and an auxiliary circuit 52. The main circuit 51 is formed of a reactor L1, a diode D5, the switching element S1, a diode D4, a filter capacitor C1 and a smoothing capacitor C3. One end of the reactor L1 is connected to the positive electrode of a direct-current power supply E that is the fuel cell FC. (FIG. 1). The anode of the diode D5 is connected to the other end of the reactor L1, and the cathode of the diode D5 is connected to one end of the load LOAD. One end of the switching element S1 is connected to the other end of the reactor L1, and the other end of the switching element S1 is connected to the negative electrode of the direct-current power supply E and the other electrode of the load LOAD. The switching element S1 turns on or off in response to the S1 gate signal transmitted from the control unit 20. In the present embodiment, the switching element S1 is an insulated gate bipolar transistor. Other than that, the switching element S1 may be a semiconductor element, such as a thyristor and a diode. The diode D4 is connected in parallel with the switching element S1 so as to protect the switching element S1. The switching element S1 is an example of a main switching element. The filter capacitor C1 is connected between the positive electrode and negative electrode of the direct-current power supply E. The smoothing capacitor C3 is connected in parallel with the load LOAD. The filter capacitor C1 and the smoothing capacitor C3 each are used to stabilize input and output of the soft switching converter 50.

On the other hand, the auxiliary circuit 52 includes a reactor L2, a diode D1, the switching element S2, a diode D2, a snubber diode D3, a snubber capacitor C2. One end of the reactor L2 is connected to the high-potential side of the reactor L1. The diode D2 is connected between the switching element S2 and the snubber diode D3. One end of the switching element S2 is connected to the cathode of the diode D2, and turns on or off in response to the S2 gate signal transmitted from the control unit 20. The anode of the snubber diode D3 is connected to the one end of the switching element S1, and the cathode of the snubber diode D3 is connected to the other end of the switching element S2. One end of the snubber capacitor C2 is connected to the cathode of the snubber diode D3, and the other end of the snubber capacitor C2 is connected to the switching element S1. The diode D1 is connected in parallel with the switching element S2 so as to protect the switching element S2. The switching element S2 is an example of an auxiliary switching element. The snubber diode D3 and the snubber capacitor C2 absorb transitional counter electromotive force that occurs at the time when the switching element S1 turns off.

The IV measuring device 60 is connected to both ends of the reactor L1 via measuring wires. The IV measuring device 60 constantly measures Vin that is the high-potential side potential of the reactor L1, Vout that is the low-potential side potential of the reactor L1 and $I_{L1\text{-}ave}$ that is the average value of current flowing through the reactor L1, and transmits those three values to the control unit 20 in real time.

Figure 3:
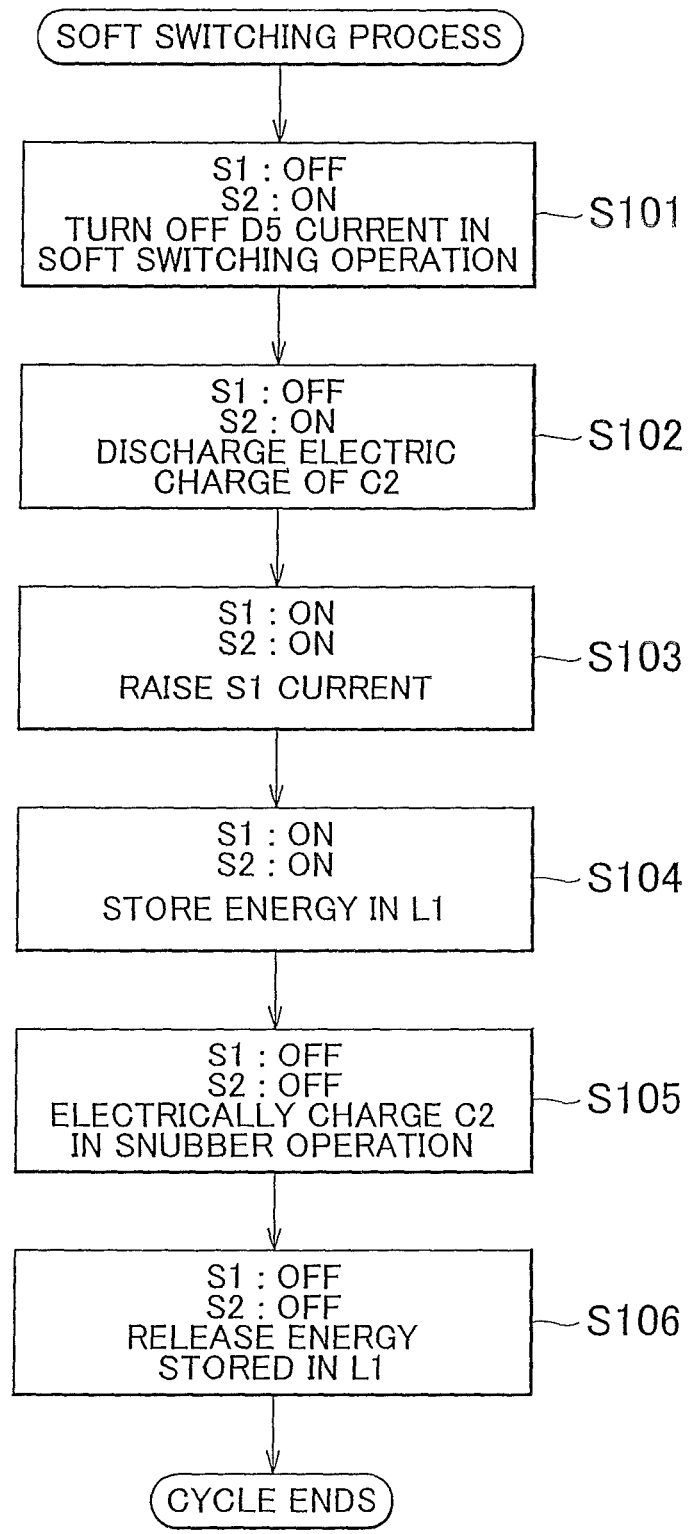
FIG. 3 is a state transition diagram that illustrates soft switching process according to the embodiment.

Next, the soft switching operation of the soft switching converter 50 will be described. FIG. 3 is a state transition diagram that illustrates one-cycle process for stepping up, voltage through soft switching operation of the soft switching converter 50 (hereinafter, also referred to as "soft switching process").

Figure 4:
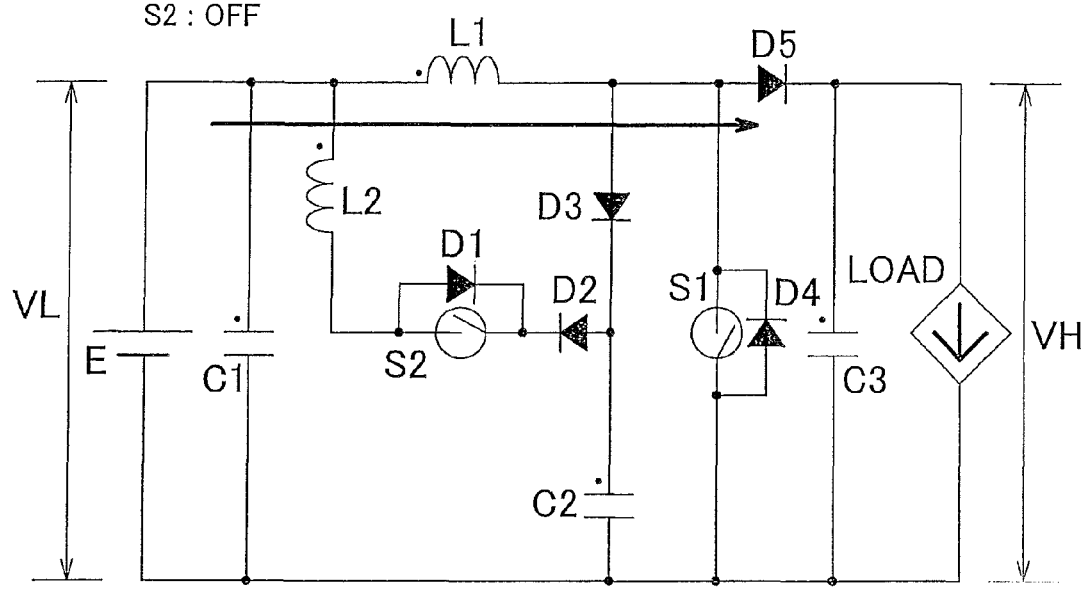
FIG. 4 is a view that illustrates an initial state in the soft switching process according to the embodiment.

In the soft switching process, processes in states S101 to S106 are sequentially executed by the control unit 20 to constitute one cycle. The states of current and voltage in the soft switching converter 50 through the processes are respectively represented by mode 1 to mode 6. FIG. 4 shows an initial state, and FIG. 5 to FIG. 10 respectively show the states in mode 1 to mode 6. Hereinafter, the soft switching process in the soft switching converter 50 will be described with reference to these drawings. In FIG. 4 to FIG. 10, for the sake of simple illustration of the drawings, the reference numerals of the main circuit 51 and auxiliary circuit 52 are omitted; however, those circuits may be cited in the description of each mode.

In the initial state (see FIG. 4) immediately before the soft switching process shown in FIG. 3 is performed, electric power is supplied from the fuel cell FC to the load LOAD, that is, both the switching elements S1 and S2 are turned off and current flows toward the load LOAD via the reactor L1 and the diode D5. Thus, as the one cycle of the soft switching process ends, it enters the same state as the initial state.

Figure 5:
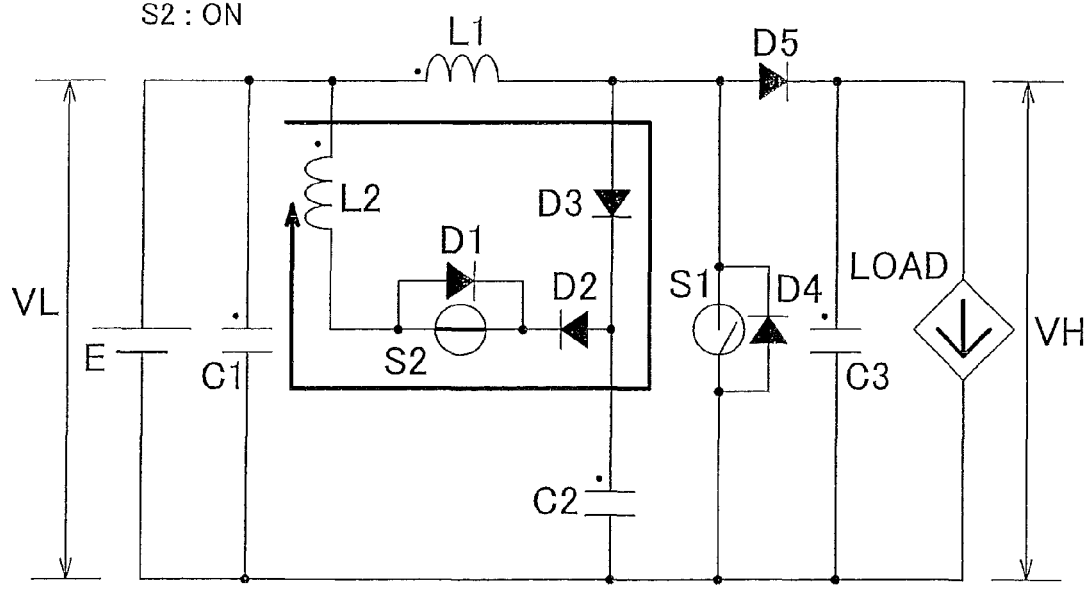
FIG. 5 is a view that illustrates mode 1 in the soft switching process according to the embodiment.

In the soft switching process (see FIG. 3), the state changes from the initial state to the state of mode 1 (see FIG. 5), and the current and voltage state of mode 1 shown in FIG. 5 is established (state S101). Specifically, in a state where the switching element S1 is turned off, the switching element S2 is turned on. By so doing, current flowing toward the load LOAD via the reactor L1 and the diode D5 gradually shifts toward the auxiliary circuit 52 because of a potential difference between the output voltage VH and input voltage VL of the soft switching converter 50.

Figure 6:
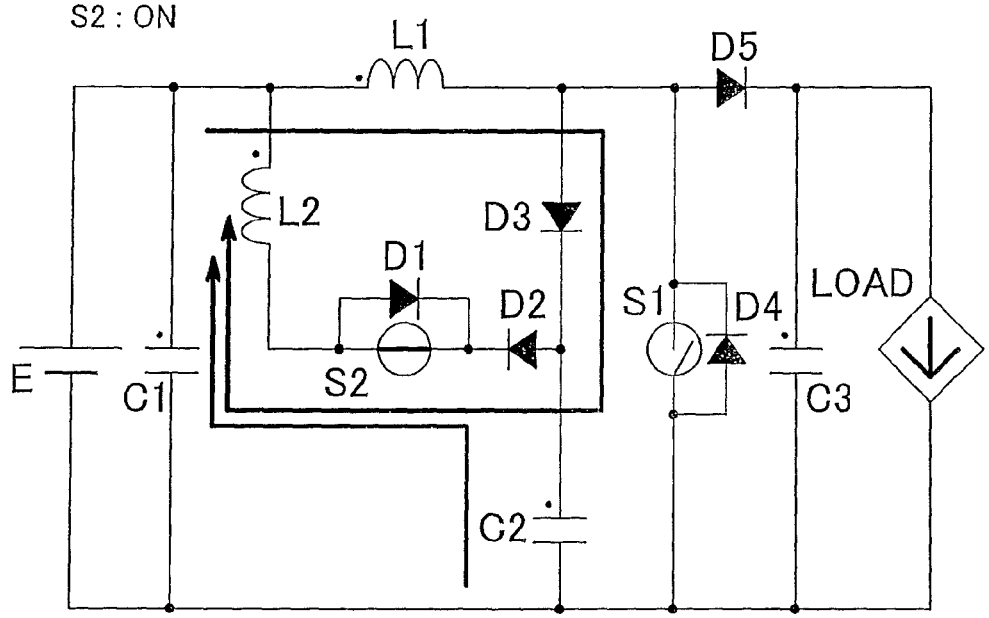
FIG. 6 is a view that illustrates mode 2 in the soft switching process according to the embodiment.

When the state of mode 1 continues for a predetermined period of time, current flowing through the diode D5 becomes zero, and the electric charge stored in the snubber capacitor C2 flows into the auxiliary circuit 52 because of the potential difference between the snubber capacitor C2 and the voltage VL of the fuel cell FC instead (state S102: state of mode 2 shown in FIG. 6). In mode 2, the electric charge of the snubber capacitor C2, which influences the voltage applied to the switching element S1 when the switching element S1 is turned on, flows through the diode D2 of the auxiliary circuit 52, the switching element S2 and the reactor L2, so the voltage applied to the snubber capacitor C2 decreases. At this time, because of half-wave resonance between the reactor L2 and the snubber capacitor C2, current continues flowing until the voltage of the snubber capacitor C2 becomes zero. The electric charge of the snubber capacitor C2 determines the voltage between both ends of the switching element S1 connected in parallel with the snubber capacitor C2. As a result, when the switching element S1 is turned on in state S103 (FIG. 3), it is possible to decrease the voltage applied between both ends of the switching element S1.

Figure 7:
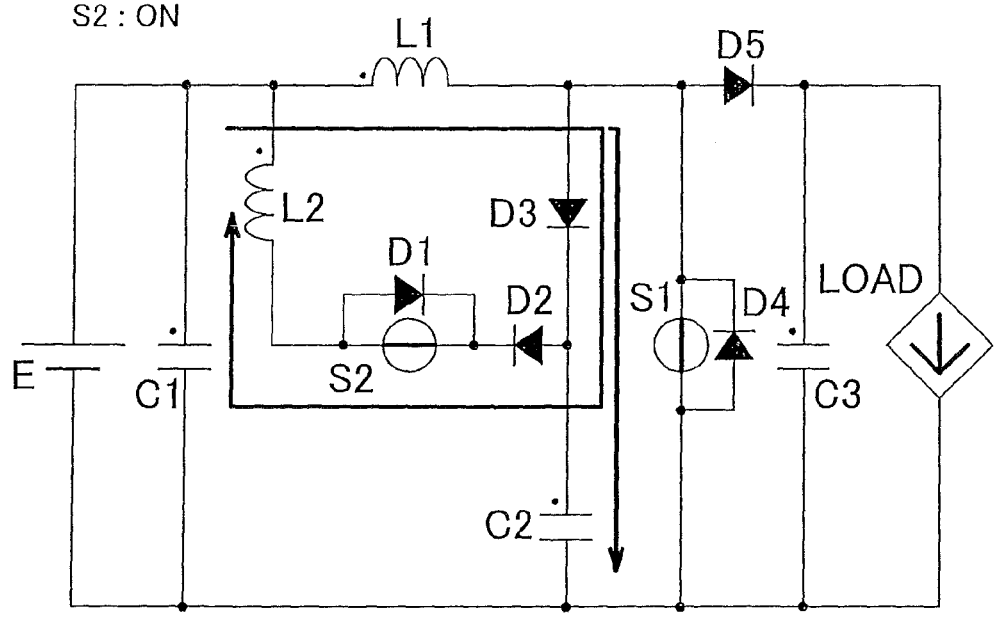
FIG. 7 is a view that illustrates mode 3 in the soft switching process according to the embodiment.
Figure 8:
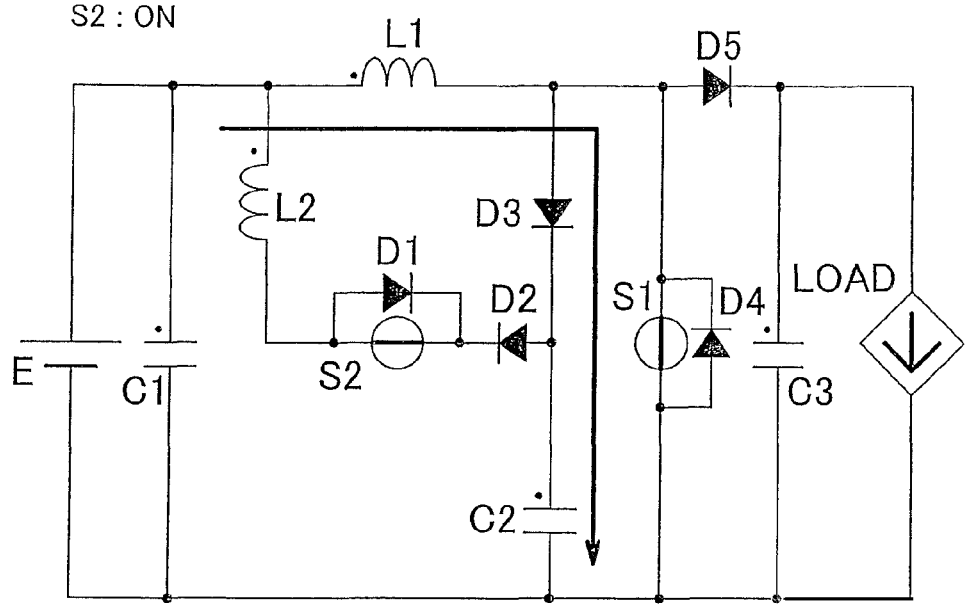
FIG. 8 is a view that illustrates mode 4 in the soft switching process according to the embodiment.
Figure 9:
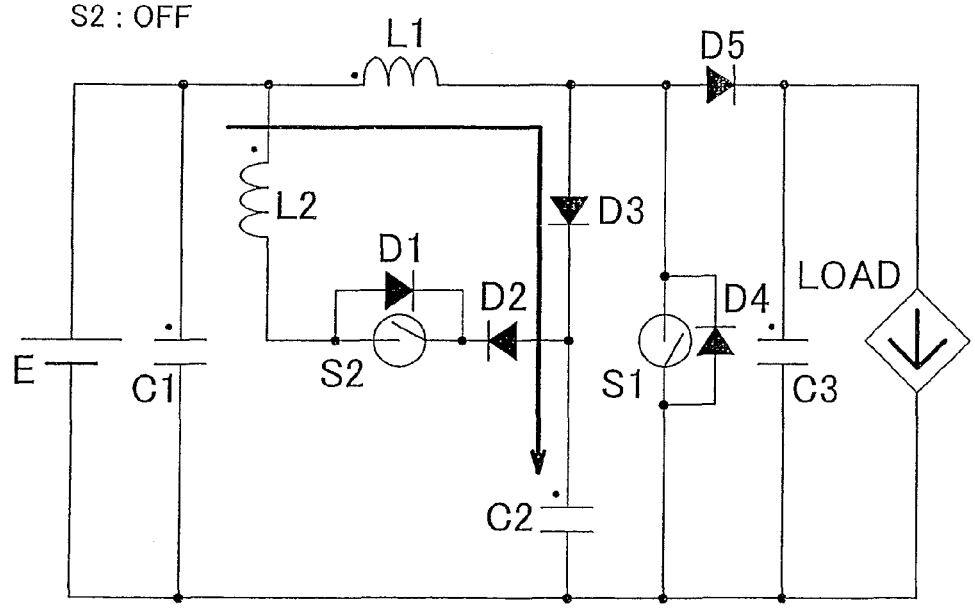
FIG. 9 is a view that illustrates mode 5 in the soft switching process according to the embodiment.
Figure 10:
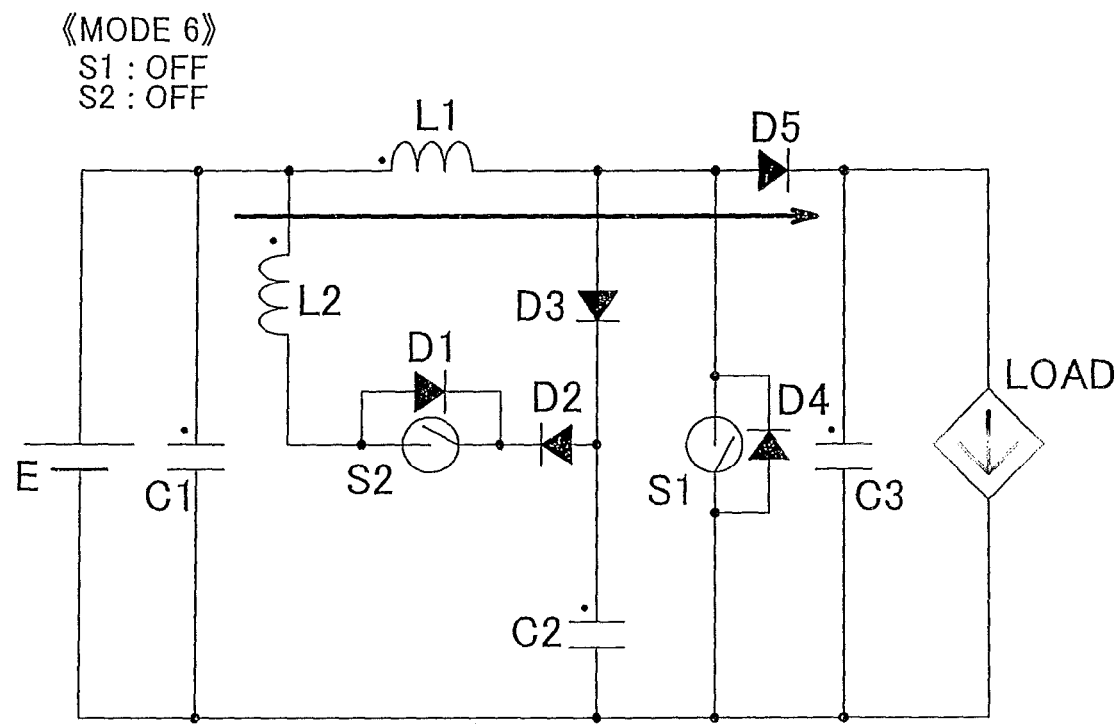
FIG. 10 is a view that illustrates mode 6 in the soft switching process according to the embodiment.

Furthermore, in state S103, at the timing at which the electric charge of the snubber capacitor C2 is fully discharged, the switching element S1 is turned on, and the current and voltage state of mode 3 shown in FIG. 7 is established. That is, in a state where the voltage of the snubber capacitor C2 is zero, the voltage applied between both ends of the switching element S1 is also zero. Then, when the switching element S1 is turned on in this state, a power loss due to switching in the switching element S1 (hereinafter, also referred to as "switching loss") is theoretically zero because the switching element S1 is in a zero voltage state and current starts flowing in this state.

Then, in state S104, the state S103 continues to increase the amount of current flowing into the reactor L1 to thereby gradually increase energy stored in the reactor L1. This state is the current and voltage state of mode 4 shown in FIG. 8. After that, in a state where a desired energy is stored, in the reactor L1, the switching element S1 and the switching element S2 are turned off in state S105. Then, the snubber capacitor C2, which has discharged electric charge in mode 2 to enter a low voltage state, is electrically charged, and then reaches the voltage equal to the output voltage VH of the soft switching converter 50. This state is the current and voltage state of mode 5 shown in FIG. 9. Then, when the snubber capacitor C2 is electrically charged up to the voltage VH, the energy stored in the reactor L1 is released to the load LOAD in state 5106. This state is the current and voltage state of mode 6 shown in FIG. 10. Note that, at the time of transition from the state of mode 4 to the state of mode 5, the rising of the voltage applied to the switching element S1 when the switching elements S1 and S2 are turned off may be delayed by the snubber capacitor C2, so a switching loss due to tail current in the switching element S1 may be further reduced.

Soft switching process having the processes of states S101 to S106 is performed as described above. By so doing, a switching loss in the soft switching converter 50 is suppressed as much as possible to thereby make it possible to raise the output voltage of the fuel cell FC and supply the voltage to the load LOAD.

Next, control over the timings of switching of the switching elements S1 and S2 of the above described soft switching converter 50 (hereinafter, also referred to as switching control) will be described. Switching control is performed in such a manner that the control unit 20 controls the timing at which the S1 gate signal is input to the switching element S1 and the timing at which the S2 gate signal is input to the switching element S2. In the description, switching control from mode 1 to mode 3 (state S101 to state S103 in FIG. 3) in the soft switching process will be specifically described.

Figure 11A:
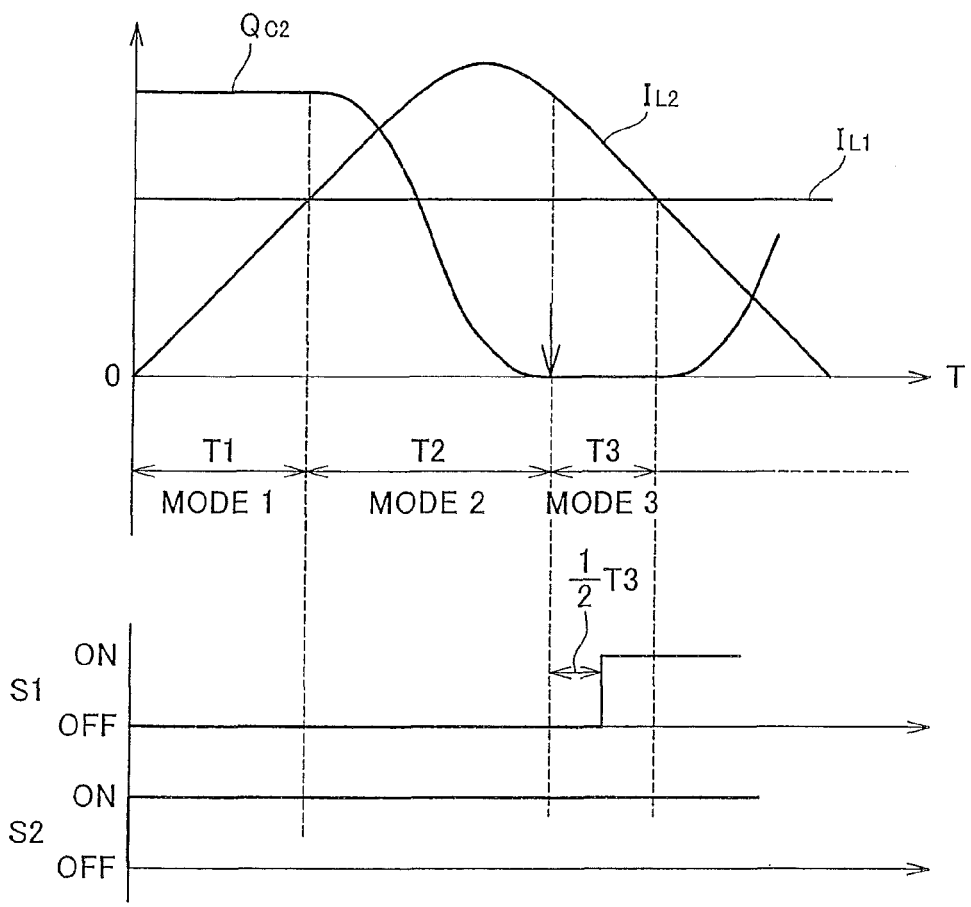
FIG. 11A and FIG. 11B are graphs that illustrate time periods T1 to T3 in switching control according to the embodiment.
Figure 11B:
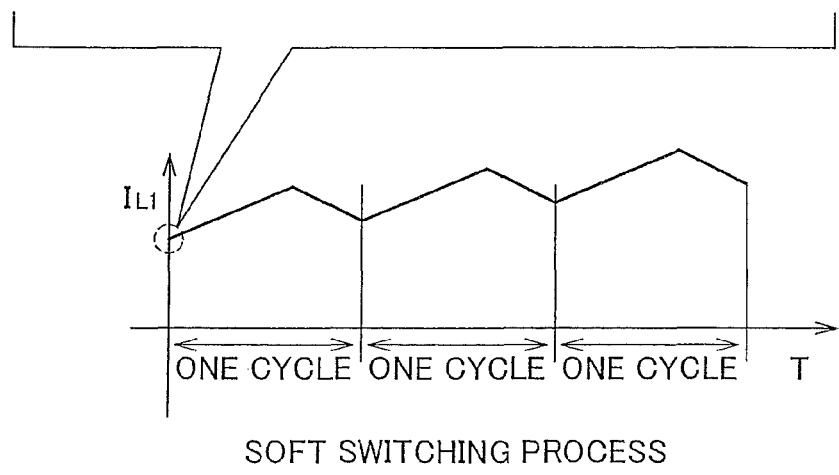

FIG. 11A is a view that illustrates a time period T1 of mode 1, a time period T2 of mode 2 and a time period T3 of mode 3. FIG. 11A and FIG. 11B show the relationship among a current $I_{L1}$ that flows through the reactor L1, a current $I_{L2}$ that flows through the reactor L2 and an electric charge $Q_{C2}$ that is charged to the snubber capacitor C2 in each of mode 1, mode 2 and mode 3. For the sake of easy description, $I_{L1}$, $I_{L2}$ and $Q_{C2}$ are described in one graph, so the ordinate axis of FIG. 11A represents ampere (A) and coulomb (q). FIG. 11B is a schematic graph that schematically shows changes in $I_{L1}$ in one cycle of the soft switching process (three cycles are described in FIG. 11B). As shown in FIG. 11A and FIG. 11B, the time span of the graph shown in FIG. 11A is a relatively short time period from the start of one cycle of the soft switching process in FIG. 11B. Thus, the value of $I_{L1}$ in FIG. 11A is a minimum value $I_{L1 \cdot min}$ in one cycle of the soft switching process and may be approximated as a constant value.

In mode 1 shown in FIG. 11A, the switching element S2 turns on from the initial state, and $I_{L2}$ increases. The end of mode 1, that is, the start of mode 2, is the time point at which $I_{L2}$ becomes larger than $I_{L1}$. The time period T1 from the start of mode 1 to the end of mode 1 may be calculated in such a manner that a predetermined differential equation is computed under a predetermined initial condition using the following mathematical expression (1).

$$T1 = \frac{I_{L1 \cdot min} \cdot H_{L2}}{Vout - Vin} \quad (1)$$

As described in FIG. 2, Vin and Vout in the mathematical expression (1) denote the high-potential side potential and the low-potential side potential in the reactor L1, measured by the IV measuring device 60 (see FIG. 2). "$I_{L1 \cdot min}$" is a minimum value of the waveform of the cycle of $I_{L1}$ shown in FIG. 11B, that is, the value of $I_{L1}$ at the valley of the waveform. The value of "$I_{L1 \cdot min}$" is calculated in real time through computation on the basis of $I_{L1 \cdot ave}$ measured by the IV measuring device 60. "$H_{L2}$" in the mathematical expression (1) denotes the inductance of the reactor L2 (hereinafter, also referred to as "inductance $H_{L2}$"), and is preset in the control unit 20 as a constant. The control unit 20 calculates the time period T1 in real time during execution of the soft switching process on the basis of Vin, Vout and $I_{L1 \cdot min}$ acquired in real time and the preset inductance '$H_{L2}$ each one cycle of the soft switching process.

In FIG. 11A, in the soft switching converter 50, when mode 1 ends, that is, when $I_{L2}$ becomes larger than $I_{L1}$, the state of mode 2 is started. As described above, the end of mode 2 is the time at which $Q_{C2}$ that is the electric charge stored in the snubber capacitor C2 is equal to 0. The time period T2 that is the time period from the start of mode 2 to the end of mode 2 may be calculated in such a manner that a predetermined differential equation is computed under a predetermined initial condition using the following mathematical expression (2).

$$T2 = \frac{1}{\omega}\left\{\pi - \arccos\left(\frac{Vin}{Vout - Vin}\right)\right\} \quad (2)$$

$$\omega = \frac{1}{\sqrt{H_{L2} \cdot Q_{C2}}}$$

In the mathematical expression (2), "$Q_{C2}$" denotes the capacitance of the snubber capacitor C2 (hereinafter, also referred to as "capacitance $Q_{C2}$"), and is preset in the control unit 20 as a constant. As in the case of the mathematical expression (1), Vin denotes the high-potential side potential in the reactor L1, and Vout denotes the low-potential side potential in the reactor L1. The control unit 20 calculates the time period T2 in real time during execution of the soft switching process on the basis of the constantly measured Vin and Vout and the preset $H_{L2}$ and $Q_{C2}$.

In FIG. 11A, in the soft switching converter 50, when mode 2 ends, that is, when $Q_{C2}$ becomes 0, the state of mode 3 is started. The end of mode 3 is the time point at which $I_{L2}$ becomes smaller than $I_{L1}$. In other words, the end of mode 3 is the time point at which the snubber capacitor. C2 is started to be electrically charged. The time period T3 from the start of mode 3 to the end of mode 3 may be calculated in such a manner that a predetermined differential equation is computed under a predetermined initial condition using the following mathematical expression (3). In addition, $I_{L2 \cdot T2end}$ in the following mathematical expression (3) may be calculated using the following mathematical expression (4).

$$T3 = \frac{H_{L2}}{R'} \ln\left\{1 + \frac{R'}{V'}(I_{L2 \cdot T2end} - I_{L1 \cdot min})\right\} \quad (3)$$

$$R' = R + R_{D4}$$

$$R = R_{S2} + R_{D2} + R_{D3}$$

$$V' = Vin + V_{S2} + V_{D2} + V_{D3} + V_{D4} + RI_{L1 \cdot min}$$

$$I_{L2 \cdot T2end} = I_{L1 \cdot min} + \omega \cdot Q_{C2} \sqrt{Vout \cdot (Vout - 2Vin)} \quad (4)$$

In the mathematical expression (3), $R_{S2}$, $R_{D2}$, $R_{D3}$ and $R_{D4}$ respectively denote the on resistances of the switching element S2, diode D2, snubber diode D3 and diode D4, and are preset in the control unit 20 as constants. $V_{S2}$, $V_{D2}$, $V_{D3}$ and $V_{D4}$ respectively denote the on voltages of the switching element S2, diode D2, snubber diode D3 and diode D4, and are preset in the control unit 20 as constants. In addition, $I_{L2 \cdot T2end}$ denotes $I_{L2}$ at the end of the time period T2, and may be expressed as the above mathematical expression (4). In the mathematical expression (4), the value of $I_{L1 \cdot min}$ is calculated in real time on the basis of $I_{L1 \cdot ave}$ through predetermined computation. Thus, the control unit 20 calculates the time period T3 in real time during execution of the soft switching process on the basis of $I_{L2 \cdot T2end}$ calculated on the basis of $I_{L1 \cdot min}$ acquired through measurement, the above predetermined on resistances and on voltages, and the like.

The control unit 20 not only calculates the time period T1, the time period T2 and the time period T3 but also calculates the timing at which the switching element S1 is turned on in mode 3, and transmits the S1 gate signal toward the switching element S1 so that the switching element S1 turns on at the calculated timing. As shown in FIG. 11A and FIG. 11B, the timing at which the switching element S1 turns on may be set to when the electric charge $Q_{C2}$ stored in the snubber capacitor C2 is 0, that is, within the time period T3 during which the voltage applied to the switching element S1 is 0. As an appropriate timing, in the present embodiment, the switching element S1 is turned on at the timing of T1+T2+(½)T3 after the start of one cycle of the soft switching process (see FIG. 11A). Note that the timing at which the switching element S1 is turned on is not limited to the timing of T1+T2+(½)T3; the timing may be selectively set as long as it is the timing of T1+T2+nT3 (0<n<1).

However, in the manufacturing process of the soft switching converter 50, the inductances and capacitances of reactors and capacitors used for the soft switching converter 50 may possibly be different from rated values, and there are variations in the inductances and the capacitances. In most cases, variations in such electrical characteristics (inductance and capacitance) occur when devices, such as a reactor and a capacitor, are manufactured. That is, in the present embodiment, when those devices (the reactor L2 and the snubber capacitor C2) are assembled to the soft switching converter 50, there are variations in inductance $H_{L2}$ and capacitance $Q_{C2}$, used to calculate T1, T2 and T3.

Figure 12:
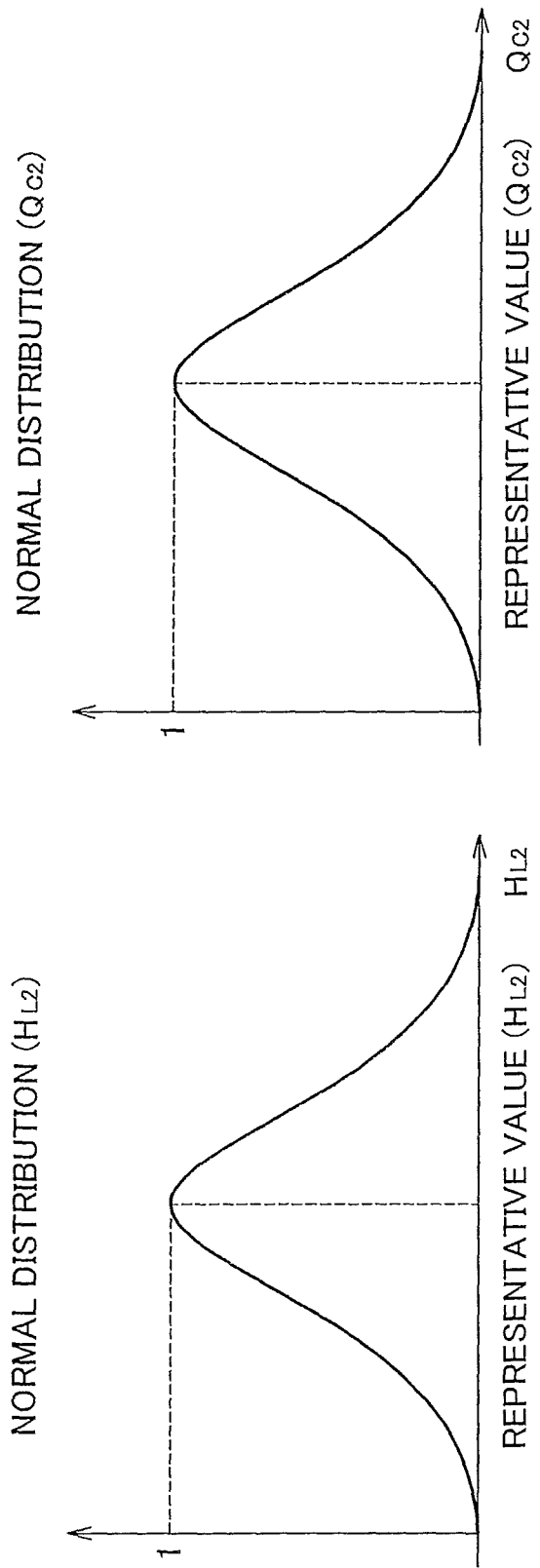
FIG. 12 shows graphs that illustrate calculation of representative values in switching control according to the embodiment.

Then, in the present embodiment, in connection with variations in the devices used to manufacture the soft switching converter 50, particularly, variations in the inductance $H_{L2}$ and capacitance $Q_{C2}$ of the reactor L2 and snubber capacitor C2 that are necessary to calculate the time period T1, the time period T2 and the time period T3, statistical processing is used to calculate respective representative values and then the calculated representative values are set in the control unit 20 as constants for calculating the time period T1, the time period T2 and the time period T3. FIG. 12 shows graphs that illustrate calculation of the representative values. As shown in FIG. 12, in the present embodiment, a normal distribution is used as the statistical processing. The inductances of the plurality of reactors L2 used to manufacture the soft switching converter 50 and the capacitances of the snubber capacitors C2 used to manufacture the soft switching converter 50 are measured one by one, and normal distributions are respectively generated in connection with the inductance and the capacitance device by device. Then, the values of the electrical characteristics corresponding to the maximum values of the generated normal distributions are respectively employed as representative values of the electrical characteristics (inductance $H_{L2}$ and capacitance $Q_{C2}$) of various devices (in the present embodiment, the reactor L2 and the snubber capacitor C2), and then the representative values are set in the control unit 20 as the inductance of the reactor L2 and the capacitance of the snubber capacitor C2. The control unit 20 calculates the time period T1, the time period T2 and the time period T3 through computation during execution of the soft switching process on the basis of the representative values of the electrical characteristics of the various devices, calculated and set by means of the statistical processing, and the timing at which the switching element S1 is turned on in the above described mode 3, that is, T1+T2+(½)T3, is calculated to thereby control the timing of switching.

As described above, when a plurality of the soft switching converters 50 are manufactured, a plurality of sets of component devices (the reactor L2, the snubber capacitor C2, and the like) are used. For example, focusing on the inductance $H_{L2}$ of the reactor L2, there are variations among the inductances $H_{L2}$ of the plurality of reactors L2, and the reactors L2 having inductances different from the rated value, that is, the inductance $H_{L2}$ (see the mathematical expressions (1) to (3)) that should be originally set in the control unit 20, are respectively assembled to the plurality of soft switching converters 50. In such a case, when the rated value of the electrical characteristic (inductance $H_{L2}$) of the reactor L2 is directly set in the control unit 20, the time period T1, time period T2 and time period T3 calculated by the control unit 20 may be significantly different from the time period T1, time period T2 and time period T3 in actual operation of the soft switching converter 50. Therefore; when the soft switching process is performed, a large voltage may be applied between both ends of the switching element S1 at the time of switching of the switching element S1, and a large power loss may occur.

FIG. 13 is a graph for illustrating influence of variations in electrical characteristic of the device on the time period T1, the time period T2 and the time period T3. The solid line in FIG. 13 indicates $I_{L1}$ and $I_{L2}$ when the inductance $H_{L2}$ and the capacitance $Q_{C2}$ are rated values. The dotted line Y1 and the dotted line Y2 in FIG. 13 show specific examples of $I_{L2}$ when the inductance $H_{L2}$ of the reactor L2 and the capacitance $Q_{C2}$ of the snubber capacitor C2 are different from the respective rated values. As is apparent from FIG. 13, when the inductance $H_{L2}$ or the capacitance $Q_{C2}$ differs from the corresponding rated value, $I_{L2}$ differs from $I_{L2}$ for the rated values, so the time period T1, the time period T2 and the time period T3 in actual soft switching process differ from the time period T1, the time period T2 and the time period T3 for the rated values.

In the soft switching converter 50 according to the present embodiment, the electrical characteristics of component devices are measured, and the statistical processing (normal distribution in the present embodiment) is used to calculate the representative values of the electrical characteristics of the devices, and then the representative values are set in the control unit 20 as the electrical characteristics of the devices. Thus, this reduces the possibility that a large deviation occurs between the inductance $H_{L2}$ of the reactor L2 actually assembled to the soft switching converter 50 and the representative value $H_{L2}$ set in the control unit 20 or between the capacitance $Q_{C2}$ of the snubber capacitor C2 actually assembled to the soft switching converter 50 and the representative value $Q_{C2}$ set in the control unit 20. In addition, at the time of soft switching process, the control unit 20 calculates the time period T1, the time period T2 and the time period T3 on the basis of the set representative values, and controls the timing of switching of the switching element S1. Thus, it is possible to reduce deviations due to variations in electrical characteristic of each device (hereinafter, also referred to as "timing deviation") between the time period T1, time period T2 and time period T3 calculated by the control unit 20 (hereinafter, also referred to as "rated values of T") and the time period T1, time period T2 and time period T3 in actual operation of the soft switching converter 50. As a result, it is possible to suppress a power loss due to switching operation of the switching element S1 when the soft switching process is executed.

The switching element S1 is one example of a main switching element. The switching element S2 is one example of an auxiliary switching element. The electrical characteristics (for example, $Q_{C2}$, $H_{L2}$, $R_{S2}$, $R_{D2}$, $R_{D3}$, $R_{D4}$, and the like) of devices in the mathematical expressions (1) to (3) are examples of the "electrical characteristics of specific devices". The reactor L2 and the snubber capacitor C2 for which the representative values are calculated are examples of observed devices.

Note that the aspects of the invention are not limited to the above described embodiment; the aspects of the invention may be implemented in various forms without departing from the scope of the invention. For example, the following alternative embodiments are also possible.

In the above embodiment, normal distributions are used as the statistical processing, and the electrical characteristics ($H_{L2}$ and $Q_{C2}$ in the above embodiment) corresponding to the maximum values of the normal distributions are used as the representative values; however, the aspects of the invention are not limited to this configuration. In a first alternative embodiment, a deviation from the rated value of the electrical characteristic of each device is measured, and a standard deviation based on each of the measured deviations is calculated. Then, representative values may be calculated on the basis of the rated values and the standard deviations. By so doing as well, similar advantageous effects to those of the above embodiment may be obtained.

Figure 14:
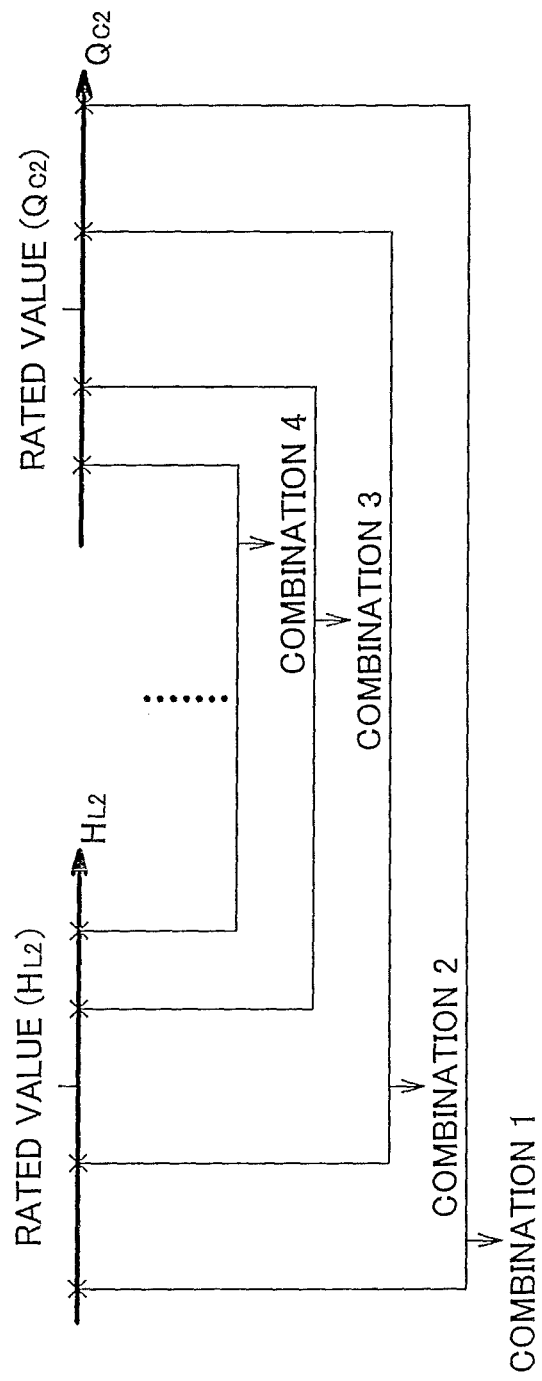
FIG. 14 is a view that illustrates a second alternative embodiment to the embodiment.

In the above embodiment, normal distributions are used as the statistical processing to suppress a deviation of the timing of switching due to variations of L2 or C2; however, the aspects of the invention are not limited to this configuration. In a second alternative embodiment, a combination of component devices that constitute the soft switching converter 50 may be selected to suppress the timing deviation. FIG. 14 is a view that illustrates selectable combinations of devices according to the second alternative embodiment. The electrical characteristics of the devices are measured to measure differential values from the rated values of the respective devices. Then, the devices of which the electrical characteristics deviate from the rated values are combined in one soft switching converter 50. A combination may be made so as to cancel deviations of the electrical characteristics of devices from the rated values. For example, as shown in FIG. 14, the reactor L2 of which the inductance $H_{L2}$ deviates from the rated value toward a positive side and the snubber capacitor C2 of which the capacitance $Q_{C2}$ deviates from the rated value toward a negative side are combined together to constitute the soft switching converter 50. Conversely, the reactor L2 of which the inductance $H_{L2}$ deviates from the rated value toward a negative side and the snubber capacitor C2 of which the capacitance $Q_{C2}$ deviates from the rated value toward a positive side are combined together to constitute the soft switching converter 50. More specifically, the inductances $H_{L2}$ of a plurality of reactors L2 and the capacitances $Q_{C2}$ of a plurality of snubber capacitors C2 are measured, and then the reactor L2 and the snubber capacitor C2 are combined so that a predetermined arithmetic expression, for example, the value k of $(H_{L2} \times Q_{C2})$, becomes constant as much as possible. For example, by making a combination so that $H_{L2} \times Q_{C2}$ becomes constant, variations in "ω" in the above mathematical expression (2) are reduced among a plurality of the soft switching converters 50. As a result, variations of the time period T2 are reduced. By making a combination in this way, it is possible to reduce the timing deviation as a whole, and it is possible to suppress the timing deviation due to variations in electrical characteristic of each device.

In the above embodiment, the control unit 20 sets T1+T2+(½)T3 for the timing at which the switching element S1 is turned on in mode 3; however, the timing is not limited to this. In a third alternative embodiment, switching of the switching element S1 may be performed at a timing that is later than a timing after a lapse of T1+T2 determined by a combination of devices (in the above embodiment, the reactor L2 and the snubber capacitor C2) by which T1+T2 becomes maximum and that is earlier than a timing after a lapse of T1+T2+(½)T3 determined by a combination of devices by which T1+T2+(½)T3 becomes minimum. Switching is performed at such a timing to improve reliability that switching of the switching element S1 may be performed at the timing at which the voltage applied between both ends of the switching element S1 takes a minimum value, and it is possible to suppress a power loss due to switching. Note that T1+T2 may be denoted by Ta, and T3 may be denoted by Tb.

In the above embodiment, focusing on the reactor L2 and the snubber capacitor C2 that constitute the soft switching converter 50, switching control is performed in accordance with variations in the inductance $H_{L2}$ and/or variations in the capacitance $Q_{C2}$; however, switching control is not limited to this configuration. In a fourth alternative embodiment, switching control may be performed additionally in consideration of variations from a rated value in the electrical characteristic of another device that constitutes the soft switching converter 50. For example, taking the above mathematical expression (3) as an example, when the time period T3 is calculated, the on resistances of $R_{S2}$, $R_{D4}$, and the like, and the on voltages of $V_{S2}$, $V_{D2}$, and the like, are used as constants. However, when those values deviate from the rated values, as in the case of the above embodiment in which representative values are calculated through statistical processing for the inductance $H_{L2}$ and the capacitance $Q_{C2}$, it is also applicable that representative values of the on resistances and on voltages are calculated through statistical processing for the on resistances and the on voltages and then the representative values are set in the control unit 20 as constants to calculate a time period (for example, T3) in each mode. By so doing, in comparison with the above embodiment, it is possible to further reduce the timing deviation.

Figure 15A:
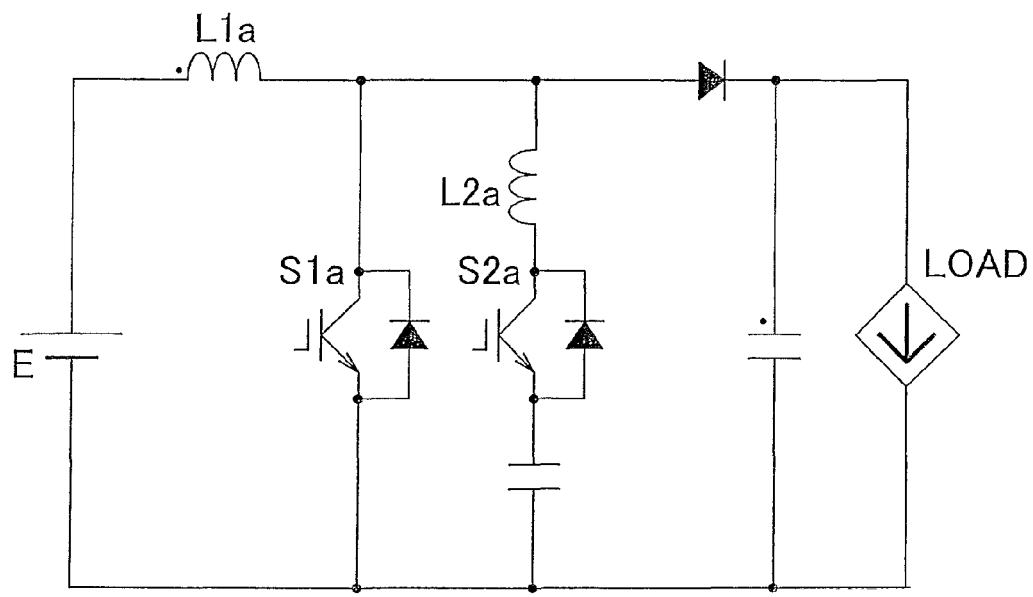
FIG. 15A and FIG. 15B are views that illustrate a fifth alternative embodiment to the embodiment.
Figure 15B:
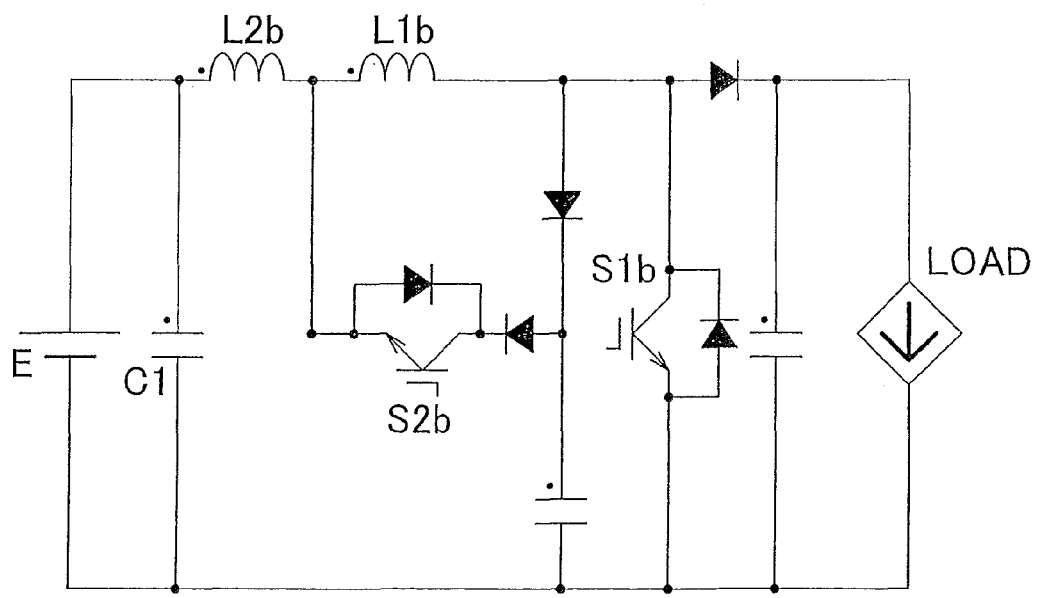

In the above embodiment, switching control according to variations in electrical characteristic of each device is applied to the soft switching converter having the circuit configuration shown in FIG. 2; however, the aspects of the invention are not limited to this configuration. In a fifth alternative embodiment, the switching control may be applied to a soft switching converter having another configuration. FIG. 15A and FIG. 15B show examples of the soft switching converter. It is applicable that control over the timing of switching described in the above embodiment is applied to variations from a rated value in inductance $H_{L2a}$ of a reactor L2a of the soft switching converter having the configuration shown in FIG. 15A or variations from a rated value in inductance $H_{L2b}$ of a reactor L2b of the soft switching converter having the configuration shown in FIG. 15B. Even when the aspects of the invention are applied to the soft switching converter having such a configuration, similar advantageous effects to those of the above embodiment may be obtained.

In the above embodiment, the soft switching converter is described as the chopper circuit that uses soft switching operation; however, the aspects of the invention are not limited to this configuration. In a sixth alternative embodiment, control over the timing of switching described in the above embodiment may be applied to a chopper circuit that uses soft switching operation. That is, the timing of switching may be controlled in accordance with variations from a rated value in electrical characteristic of each device that constitutes the chopper circuit. The chopper circuit that uses soft switching operation may be the above described DC/DC converter, an AC/DC converter, a power factor correction circuit (PFC circuit), an uninterruptible power supply (UPS), a power conditioner, a frequency converter, or the like.

The invention claimed is:

1. A manufacturing method for a plurality of chopper circuits, each chopper circuit using soft switching operation in which the timing of switching of an auxiliary switching element is controlled to thereby control a voltage applied to a main switching element at the time of switching of the main switching element, the manufacturing method comprising:
identifying devices that constitute each of the chopper circuits and that are relevant to determining time at which the voltage applied to the main switching element during operation of the chopper circuit takes a minimum value;
calculating a design representative value of an observed device that is at least one of the identified devices in such a manner that a plurality of the observed devices are prepared and then variations from a rated value in electrical characteristic of each of the observed devices are subjected to statistical processing;
manufacturing the plurality of chopper circuits using the plurality of the observed devices; and
setting the representative value, instead of the rated value of the electrical characteristic of the observed device, in a switching control unit in each of the chopper circuits, which controls the timing of switching of the main switching element and the timing of switching of the auxiliary switching element on the basis of the electrical characteristics of the identified devices.

2. The manufacturing method according to claim 1, wherein
a normal distribution is used as the statistical processing, and an electrical characteristic corresponding to a maximum value of the normal distribution is used as the representative value.

3. The manufacturing method according to claim 1, wherein
a deviation of the electrical characteristic of the observed device from the rated value is measured, a standard deviation based on the measured deviation is measured, and then the representative value is calculated on the basis of the rated value and the standard deviation.

4. The manufacturing method according to claim 1, wherein
the electrical characteristics of the identified devices include an inductance of an auxiliary reactor that controls the voltage applied to the main switching element at the time of switching of the main switching element.

5. The manufacturing method according to claim 1, wherein
the electrical characteristics of the identified devices include a capacitance of an auxiliary capacitor that controls the voltage applied to the main switching element at the time of switching of the main switching element.

6. The manufacturing method according to claim 1, wherein
optimization through the statistical processing is a process in which electrical characteristics of a predetermined number of the plurality of observed devices are measured and then the representative value is calculated on the basis of a distribution of the measured electrical characteristics.

7. A chopper circuit that uses soft switching operation in which the timing of switching of an auxiliary switching element is controlled to thereby control a voltage applied to a main switching element at the time of switching of the main switching element, the chopper circuit comprising:
a switching control unit that is configured to control the timing of switching of the main switching element and the timing of switching of the auxiliary switching element using a design representative value of an observed device that is at least one of specific devices that constitute the chopper circuit and that are relevant to determining time at which the voltage applied to the main switching element takes a minimum value, wherein the representative value is calculated in such a manner that a plurality of the observed devices are prepared and then variations from a rated value in electrical characteristic of each observed device are subjected to statistical processing.

8. The chopper circuit according to claim 7, wherein
when a period of time up to when the voltage applied to the main switching element becomes a minimum value is Ta and a period of time during which the voltage is maintained at the minimum value is Tb, the switching control unit controls the switching at a timing that is later than a timing after a lapse of Ta determined by a combination of the specific devices by which Ta becomes maximum and that is earlier than a timing after a lapse of Ta+½ Tb determined by a combination of the specific devices by which Ta+½ Tb becomes minimum.

9. A DC/DC converter comprising:
a DC input unit that is connected to a direct-current power supply;
a chopper circuit that converts a voltage of a direct-current power input from the DC input unit, that includes a main switching element and an auxiliary switching element, and that uses soft switching operation in which the timing of switching of the auxiliary switching element is controlled to thereby control a voltage applied to the main switching element at the time of switching of the main switching element;
a DC output unit that outputs the direct-current voltage of which a voltage is converted by the chopper circuit; and
a switching control unit that is configured to control the timing of switching of the main switching element and the timing of switching of the auxiliary switching element using a design representative value of an observed device that is at least one of specific devices that constitute the chopper circuit and that are relevant to determining time at which the voltage applied to the main switching element takes a minimum value, wherein the representative value is calculated in such a manner that a plurality of the observed devices are prepared and then variations from a rated value in electrical characteristic of each observed device are subjected to statistical processing.

10. A fuel cell system comprising:
a fuel cell that supplies electric power to a load;
a DC/DC converter that uses a chopper circuit having a main switching element and an auxiliary switching element to control a voltage of the electric power, wherein the chopper circuit uses soft switching operation in which the timing of switching of the auxiliary switching element is controlled to thereby control a voltage applied to the main switching element at the time of switching of the main switching element; and
a switching control unit that is configured to control the timing of switching of the main switching element and the timing of switching of the auxiliary switching element using a design representative value of an observed device that is at least one of specific devices that constitute the chopper circuit and that are relevant to determining time at which the voltage applied to the main switching element takes a minimum value, wherein the representative value is calculated in such a manner that a plurality of the observed devices are prepared and then variations from a rated value in electrical characteristic of each observed device are subjected to statistical processing.

11. A control method for controlling the timing of switching of a main switching element and the timing of switching of an auxiliary switching element, wherein the main switching element and the auxiliary switching element are included in a chopper circuit that uses soft switching operation in which the timing of switching of the auxiliary switching element is controlled to thereby control a voltage applied to the main switching element at the time of switching of the main switching element, the control method comprising:
calculating a design representative value of an observed device, which is at least one of specific devices that constitute the chopper circuit and that are relevant to determining time at which the voltage applied to the main switching element takes a minimum value, in such a manner that a plurality of the observed devices are prepared and then variations from a rated value in electrical characteristic of each observed device are subjected to statistical processing; and
controlling the timing of switching of the main switching element and the timing of switching of the auxiliary switching element using the representative value.

* * * * *